United States Patent
Dover

(10) Patent No.: US 10,637,648 B2
(45) Date of Patent: Apr. 28, 2020

(54) STORAGE DEVICE HASH PRODUCTION

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 226 days.

(21) Appl. No.: 15/693,144

(22) Filed: Aug. 31, 2017

(65) Prior Publication Data

US 2018/0278412 A1    Sep. 27, 2018

Related U.S. Application Data

(60) Provisional application No. 62/476,549, filed on Mar. 24, 2017.

(51) Int. Cl.

| | |
|---|---|
| *H04L 29/06* | (2006.01) |
| *H04L 9/06* | (2006.01) |
| *H04L 9/08* | (2006.01) |
| *H04L 9/32* | (2006.01) |
| *G06F 21/64* | (2013.01) |

(52) U.S. Cl.
CPC .......... *H04L 9/0643* (2013.01); *G06F 21/64* (2013.01); *H04L 9/0819* (2013.01); *H04L 9/0838* (2013.01); *H04L 9/0894* (2013.01); *H04L 9/3236* (2013.01); *H04L 9/3239* (2013.01); *H04L 9/3242* (2013.01)

(58) Field of Classification Search
CPC ... H04L 9/0643; H04L 9/3236; H04L 9/3239; H04L 9/3242; G06F 21/64
See application file for complete search history.

(56) References Cited

U.S. PATENT DOCUMENTS

| | | | |
|---|---|---|---|
| 8,315,381 B2 | 11/2012 | Qi et al. | |
| 2003/0223423 A1* | 12/2003 | Yu | H04L 45/7453 370/392 |
| 2008/0320302 A1* | 12/2008 | Pilant | H04L 63/10 713/161 |

(Continued)

FOREIGN PATENT DOCUMENTS

| | | |
|---|---|---|
| KR | 1020100007917 A | 1/2010 |
| WO | WO-2010127075 A1 | 11/2010 |

OTHER PUBLICATIONS

"International Application Serial No. PCT/US2018/024045, International Search Report dated Jul. 13, 2018", 4 pgs.

(Continued)

*Primary Examiner* — Thaddeus J Plecha
(74) *Attorney, Agent, or Firm* — Schwegman Lundberg & Woessner, P.A.

(57) ABSTRACT

System and techniques for storage device hash production are described herein. A data transmission received at an interface of the storage device is decoded. Here, the data transmission includes a command corresponding to a hash operation, a set of input identifications, and an output identification. Members of the set of input identifications are marshalled to produce an input set. A hash engine of the storage device is invoked on the input set to produce a hash product. The hash product is stored in a portion of the storage device corresponding to the output identification.

30 Claims, 5 Drawing Sheets

(56) References Cited

U.S. PATENT DOCUMENTS

| | | | |
|---|---|---|---|
| 2009/0144563 A1* | 6/2009 | Souza | G06F 21/54 |
| | | | 713/193 |
| 2011/0055471 A1* | 3/2011 | Thatcher | G06F 3/0608 |
| | | | 711/114 |
| 2013/0159733 A1* | 6/2013 | Lee | H04L 9/08 |
| | | | 713/193 |
| 2013/0238566 A1* | 9/2013 | Nakamura | G06F 21/64 |
| | | | 707/690 |
| 2013/0268749 A1 | 10/2013 | Blankenbeckler et al. | |
| 2014/0195782 A1 | 7/2014 | Yap et al. | |
| 2015/0081994 A1* | 3/2015 | Christopher | G06F 11/1458 |
| | | | 711/162 |
| 2016/0378687 A1 | 12/2016 | Durham et al. | |
| 2016/0380772 A1* | 12/2016 | Gopal | H04L 9/3242 |
| | | | 713/170 |

OTHER PUBLICATIONS

"International Application Serial No. PCT/US2018/024045, Written Opinion dated Jul. 13, 2018", 8 pgs.

* cited by examiner

STORAGE DEVICE HASH PRODUCTION

CLAIM OF PRIORITY

This patent application claims the benefit of priority, under 35 U.S.C. § 119, to U.S. Provisional Application Ser. No. 62/476,549, titled "STORAGE DEVICE HASH PRODUCTION" and filed on Mar. 24, 2017, the entirety of which is hereby incorporated by reference herein.

TECHNICAL FIELD

Embodiments described herein generally relate to computer storage devices and more specifically to storage device hash production.

BACKGROUND

Storage devices are computer hardware designed to store data. Storage devices can be known as memory, mass storage, or the like. Storage devices generally include media to hold data (e.g., bits, bytes, blocks, etc.) controller hardware and an interface to facilitate querying the data and, in write capable storage devices, to write data.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various embodiments discussed in the present document.

DETAILED DESCRIPTION

With the increased computerization of many manufactured goods—such as computerized control systems of vehicles, computerized (e.g., smart) appliances or sensors (e.g., Internet of Things (IoT) devices), among others—storage devices are now found in many goods that are not traditionally thought of as computers. Computerization of these goods can be done over time and can be difficult to change. For example, the automotive controller area network (CAN) bus is a vehicle communications standard to allow linking of various controllers. However, as vehicles can be long-lived, these systems can have vulnerabilities or weakness unknown at the time of standardization that are prohibitively difficult or expensive to fix. Further, that many expensive manufacturing processes can be created to implement one standard, even new vehicles can include an outdated or unsecure standard in order to maintain compatibility with the controllers of a variety of vendors, for example.

Security concerns regarding users, data, or executable programs are generally prevalent in all computing platforms. Due to the general inflexibility of embedded systems, such as those included in the manufactured goods discussed above, embedded system security often lags behind that of more general computing devices. However, even in general computing devices, designing new host boards (e.g., motherboards) to include additional security hardware can be cost prohibitive. What is needed is enhanced security hardware that can interface with other computing components in general or embedded computer systems without modifying the other hardware components.

To address the previously discussed issues, a storage device is modified to include cryptographic components, such as a hash engine. The storage device is also enhanced to accept an additional command from an external entity (e.g., a processor, device, etc.) to invoke a hash operation performed by the hash engine. The additional command operates in a manner similar to other commands provided by external entities to the storage device, such as data reads or writes. Accordingly, the hardware interface of the storage device to a system remains the same allowing the storage device to be included, without modification, to existing systems. Software of existing systems can be modified, however, to invoke the hash operation command and thus gain the benefit of the cryptographic components of the storage device. This arrangement permits the cryptographic enhancement of systems, including embedded systems, without redesigning manufacturing processes for these systems. Additional examples and details are described below.

Figure 1:
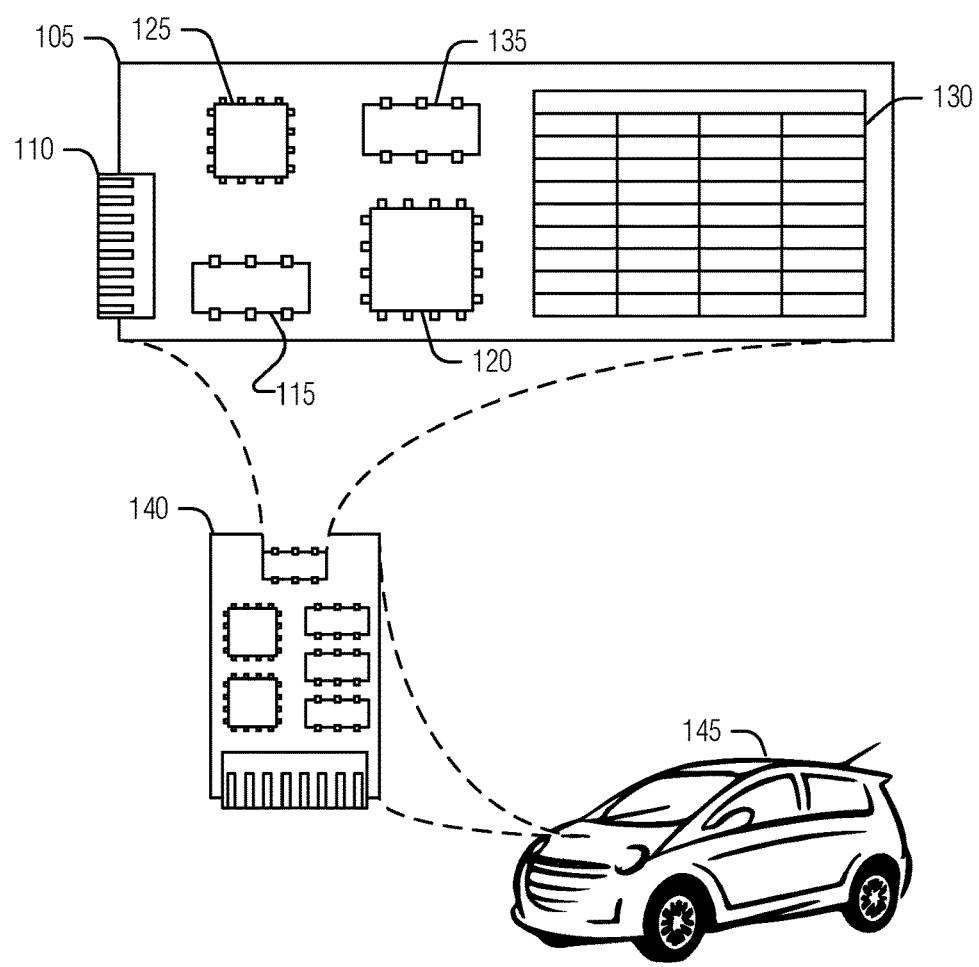
FIG. 1 is a block diagram of an example of an environment including a system for storage device hash production, according to an embodiment.

FIG. 1 is a block diagram of an example of an environment including a system for storage device hash production, according to an embodiment. The environment 100 includes a system 140 embedded into a manufactured good 145. As noted above, the manufactured good 145 can include a variety of things, such as a vehicle (as shown) including unmanned vehicles, an appliance, furniture, a structure, a sensor, clothing, or other items in which the system 140 can be included (e.g., embedded). Recent trends to create "smart" items or add communication capabilities to goods that previously operated without such abilities, such as many appliances (e.g., refrigerators, washing machines, etc.) or sensors can be referred to as creating the IoT, the participating goods being transformed in to IoT devices.

The system 140 can include an interface to communicate with one or more components of the manufactured good 145 that are external to the system 140. For example, if the system 140 is an in-vehicle entertainment system, the interface permits the system 140 to control speakers, and can permit receiving content from a user's device (e.g., phone, personal music player, tablet, etc.). The system can also include one or more processors (e.g., central processing unit, low-power processor, digital signal processor, graphic processing unit, etc.), and one or more storage devices (e.g., mass storage, memory, static memory, etc.) include the storage device 105.

The storage device 105 includes an interface 110, a decoder 115, a controller 120, a hash engine 125, and a storage portion 130. In an example, the storage device 105 and the components thereon are manufactured on a single chip. In an example, the storage device includes a register bank 135 (e.g., comprising one or more registers). All of these components of the storage device 105 are implemented in computer hardware (e.g., processing circuitry).

The interface 110 provides a hardware communications medium between the storage device 105 and other components of the system 140. In an example, the interface 110 is a Joint Electron Device Engineering Council (JEDEC) memory standards interface. In an example, the storage device 105 is a random access memory (RAM) device.

In an example, the interface 110 conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface or Non-Volatile Memory Host Controller Interface Specification (NVMHCI) interface. In an example, the storage device 105 is a flash memory device. In an example, the storage device 105 is at least one of NOR flash or NAND flash (e.g., the storage portion 130 is NOR or NAND flash). In an example, the storage device 105 is a hard disk drive (HDD).

The decoder 115 is arranged to parse a command, a set of input identifications, and an output identification from a data transmission received at the interface 110. In an example, the decoder 115 is arranged to decode other commands, such as a read or a write command to the storage device 105. In an example, the decoder 115 is part (e.g., integrated into) the controller 120.

Here, the command corresponds to a hash operation. A hash operation accepts input data and produces a hash of the input data as output. Typically a hash maps arbitrarily sized data to a fixed size. Although not required, it is generally desirable for differing input data to produce different output from the hash. When two different input data produce the same output it is called a collision. A cryptographic hash can differ from other hashes in being one-way. That is, it is difficult to produce the input data from just the output of the hash.

In an example, a member of the set of input identifications is an address of a second portion of the storage device, such as the storage portion 130 or the register bank 135. In an example, the second portion of the storage device is accessible to an external entity via the interface to the storage device. Thus, in a typical operation of a flash device, for example, the storage portion 130 is used to hold data that external entities read from and write to via commands to the storage device 105 made via the interface 110. In contrast, the register bank 135 would not generally be accessible to these external entities via the interface 110 but would rather be used by the controller 120 (or other portion of the storage device 105) for internal purposes. In an example, the second portion of the storage device is block addressable, such as a NAND flash device or a hard disk drive.

In an example, the second portion of the storage device 105 is byte addressable. Generally, though not exclusively, byte addressable storage is used to store data immediately prior to consumption by a processor. Thus, data can be retrieved from non-byte addressable storage (e.g., block addressable storage) into byte addressable storage before being operated upon by a processor. Example byte addressable media can include registers, RAM varieties (e.g., static RAM (SRAM), dynamic RAM (DRAM), etc.), core memory, NOR flash, etc. In an example, the second portion of the storage device is a register (e.g., in register bank 135). In an example, the second portion of the storage device is a nonvolatile storage media, such as NOR flash. In an example, the second portion of the storage device is not accessible to an external entity via the interface to the storage device, such as the register bank 135.

In an example, the set of input identifications define an address range of a second portion of the storage device. For example, the set of input identifications can be a list of storage blocks in the storage portion 130 of, for example, a flash device or a hard disk. The set of input identifications can be a set of byte addressable address in a storage portion 130 that is RAM. In an example, two members of the set of input identifications define the address range. This example permits the identification of a contiguous portion of the storage portion 130, for example, to reduce the signaling overhead. In an example, a first member of the two members defines the start of the range and a second member of the two members defines the end of the range. In an example, a first member of the two members defines the start of the range and a second member of the two members defines a number of units to include in the range.

In an example, a member of the set of input identifications identifies a portion of the data transmission. Whereas above, the input identifications note data already managed by the storage device 105, here, the command can be accompanied by additional data not already managed by the storage device 105. In an example, the portion of the data transmission is identified by a field. In an example, the portion of the data transmission is identified by an offset. In an example, the portion of the data transmission is also identified by a length. Thus, given these last few examples, the new data in the transmission can specify the additional data using a variety of techniques.

In an example, the hash operation is a keyed-hash message authentication code (HMAC). An HMAC is a message authentication code (MAC) where a key is combined with other data to produce the hash. HMACs can be used to verify one or both of data integrity and authenticity of a message (e.g., the other data). In an example, a subset of the set of input identifications identify a secret. Here, the secret is used as a key for the HMAC. In an example, a member of the set of input identifications identifies a current session key of the storage device. In this example, the storage device 105 can have previously entered into encrypted communications with the external entity. As part of establishing these communications, a session key can have been established between the storage device 105 and the external entity. The storage device 105 can maintain the same, or a derivative of, the session key for a number of communications or for a set period of time. The storage device 105 can maintain the session key internally, such as in the register bank 135 (or other internal memory) or in a protected part of the storage portion 130.

The controller 120 is arranged to collect members of the set of input identifications to produce an input set. The collection can include retrieving data that corresponds to addresses in the set of input identification or obtaining (e.g., retrieving or receiving) the data (e.g., a secret) from the transmission to include in the input set. The collection allows the use of previously managed (e.g., stored) data in the storage device 105 to be used the hash operation. Thus, the input set includes data rather than references to data.

The controller 120 is also arranged to instruct the hash engine 125 to produce a hash product from the input set. The hash product is at least a hash of the input set data. As noted above, the hash product can be an HMAC. In this example, the hash engine 125 is arranged to implement a cryptographic hash. In an example, the cryptographic hash is a secure hash algorithm (SHA). In an example, the hash engine 125 is arranged to produce a two hundred and fifty-six bit hash.

The controller 120 is also arranged to write the hash product in a portion (e.g., storage portion 130) of the storage device 105 corresponding to the output identification. This completes the ability for the storage device to both use data it already manages, create the hash product, and store that hash product itself. Thus, an external entity can write data to be hashed to the storage device 105 as it normally would when otherwise storing the data. The external entity can then invoke the hash operation via the command and specify a response internal to the storage device 105 for the result. The external entity can then retrieve the hash product in the same way it would otherwise retrieve data from the storage device, such as by a read command. This arrangement provides several benefits. For example, because the interface 110 conforms to other interface standards or types for the type of storage device, the storage device can be added to any system 140 configured to accept the same type of storage device. Additionally, the write, hash, read instruction cycle provides a familiar and flexible hash facility to programmers because the writing of the data and the reading of the hash product occur in a familiar fashion to other storage devices. In this way, security functions, such as HMAC messaging, or other upgrades can be added to existing systems without additional manufacturing expense to original equipment manufacturers, and thus further the penetration of systems into manufactured goods.

FIGS. 2-5 illustrate examples of messages (e.g., messages 200, 300, 400, and 500) to the storage device to invoke production of a hash by the storage device. The message formats discussed here are non-limiting examples. As noted above, the portions of the messages can be denoted by fields (e.g., tags in a markup language such as eXtensible Markup Language (XML) or the like) or by convention (e.g., the first eight bits designate the command, the second eight bits designate an input header, etc.). Further, the messages illustrated in FIGS. 2-5 have a particular order of portions (e.g., command, input header, input addresses, and output address) but variations can include a rearranging of these components (e.g., no input header, an output address, input addresses, and then the command).

Figure 2:
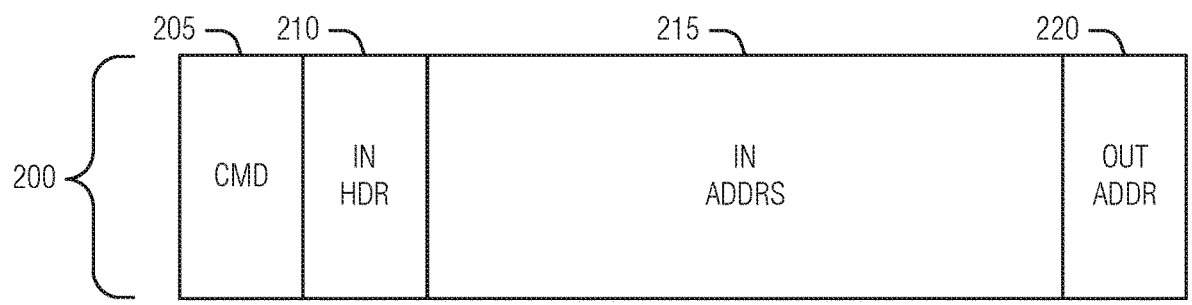
FIGS. 2-5 illustrate examples of messages to the storage device to invoke production of a hash by the storage device.

FIG. 2 illustrates an example of a message 200. The message 200 includes four portions, a command portion 205, an input header 210, an input address portion 215, and an output address 220. In an example, the command portion 205 is placed and sized according to a standard interface to the storage device. For example, if the interface of the storage device is SCSI, the first eight-bit byte is the command portion 205. The input header 210 is optional and can be used to describe the type of data in the input address portion 215. For example, if the input address portion 215 is sized for two addresses, the input header 210 can specify whether the input address portion 215 is to be treated as two distinct addresses or as a range (e.g., a start and end address or a start address and an extent). The output address 220, as described above, designates the destination of the hash product produced when the hash engine performs the hash operation of the command from the command portion 205.

Figure 3:
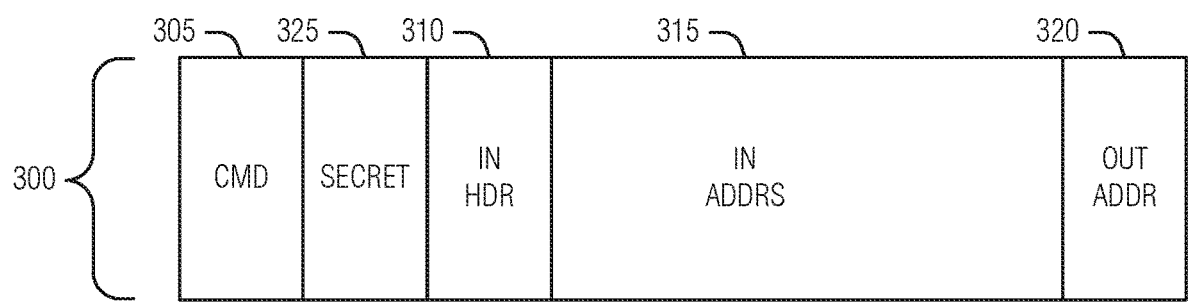

FIG. 3 illustrates an example of a message 300. The message 300 includes the command portion 305, input header 310, the input address portion 315 and the output address 320 as described above with respect to FIG. 2. The message 300 also includes a secret portion 325. The secret portion 325 holds a secret that can be used as a key to an HMAC. Here, the secret 325 stores the actual value of the key.

Figure 4:
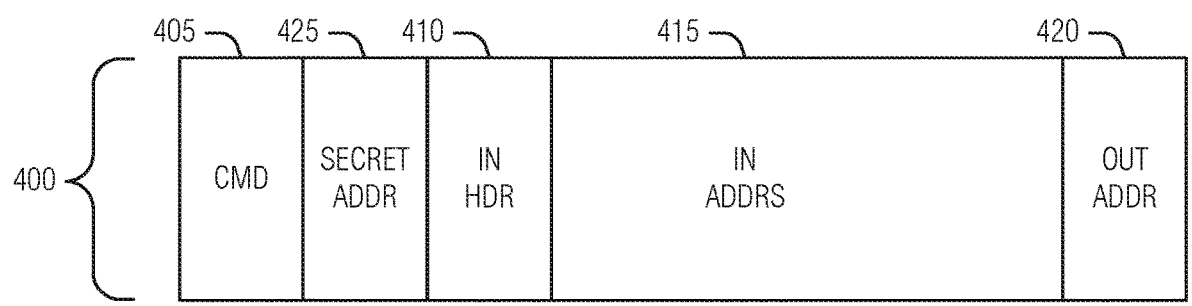

FIG. 4 illustrates an example of a message 400. The message 400 includes the command portion 405, input header 410, the input address portion 415 and the output address 420 as described above with respect to FIGS. 2 and 3. The message 400 also includes a secret address portion 425. The secret address portion 425 holds an address to an addressable location within the storage device, such as internal NAND or NOR flash blocks, a register, memory, etc. using the secret address portion 425 permits the use of larger secrets than can otherwise be possible given constraints of a particular storage interface standard. The external entity can write the secret to one or more blocks of the storage device in a previous operation and then refer to the secret via the secret address portion 425.

Figure 5:
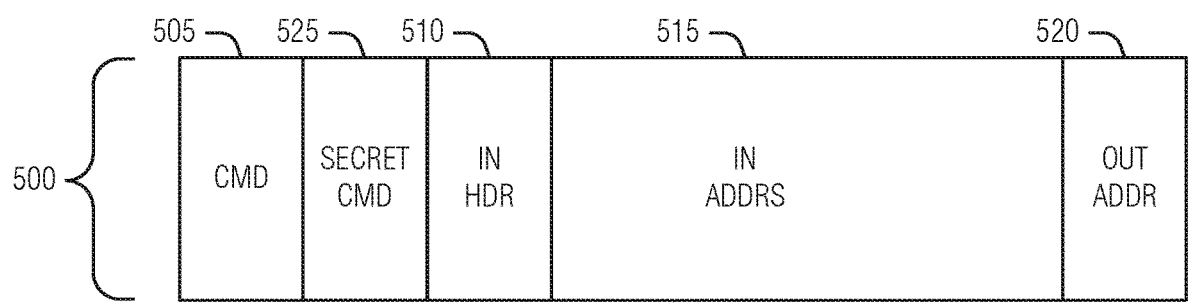

FIG. 5 illustrates an example of a message 500. The message 500 includes the command portion 505, input header 510, the input address portion 515 and the output address 520 as described above with respect to FIGS. 2-4. The message 500 also includes a secret command portion 525. The secret command portion 525 includes a directive to the storage device that specifies how to obtain the secret. An example directive can include retrieving a current session key of the storage device, or measuring a quality of the storage device using a diagnostic component. The secret command provides additional flexibility to leverage ever more sophisticated storage device hardware.

Although FIGS. 3-5 illustrated a secret holding area (e.g., secret portion 325, secret address 425, or secret command portion 525) as separate from the input address portion (e.g., 315, 415, or 515). The secret holding area can be included in the input address portion and specified, for example, in the input header.

Figure 6:
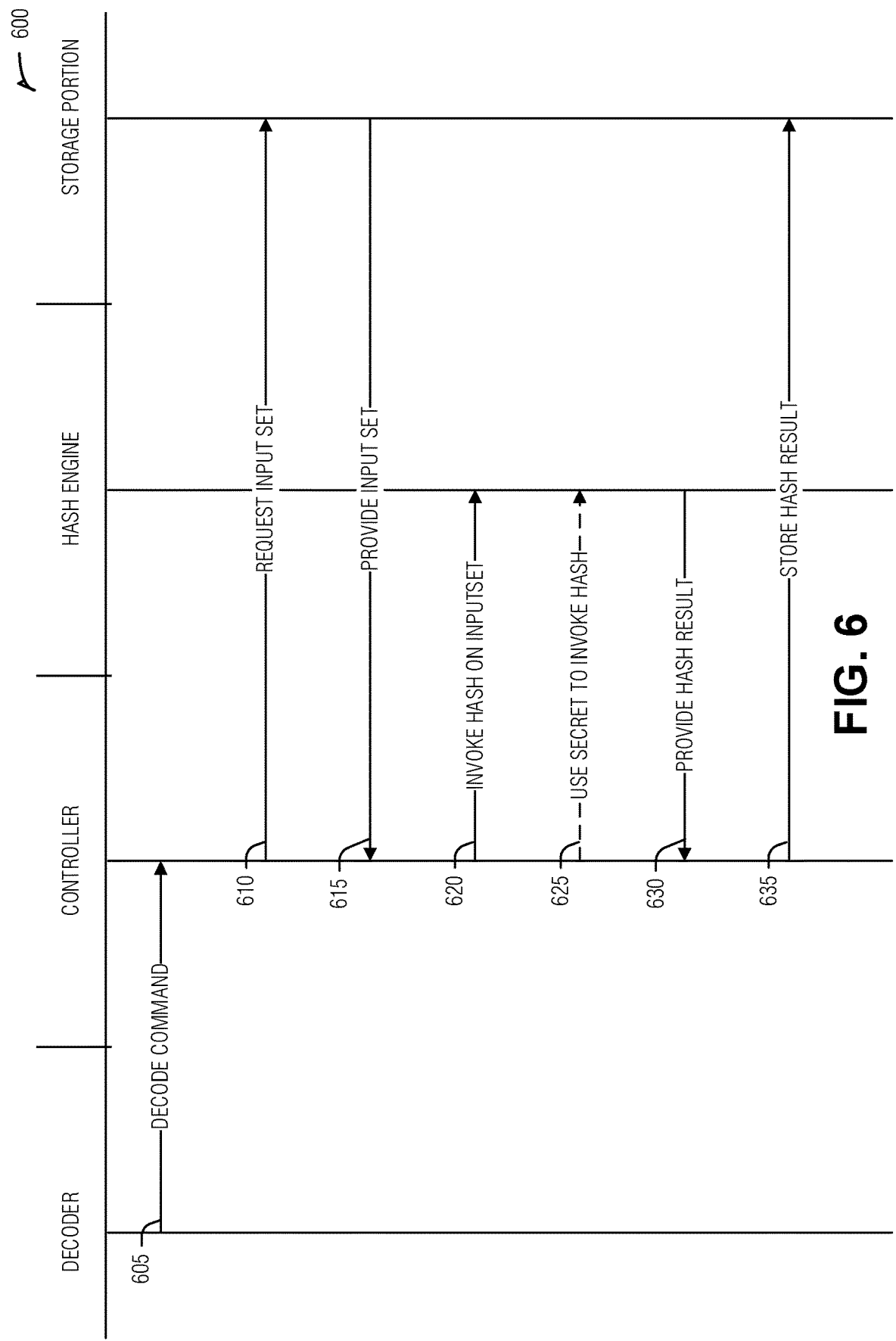
FIG. 6 is a swim lane diagram illustrating an example of component messaging within a storage device to produce a hash, according to an embodiment.

FIG. 6 is a swim lane diagram illustrating an example of component messaging 600 within a storage device to produce a hash, according to an embodiment. After a transmission is received at the interface to the storage device, the decoder decodes the command in the message (operation 605). The controller can then marshal data from the set of input identifications by requesting the data corresponding to the set of input identification (operation 610) from the storage portion and receive the input set data as provided by the storage portion (operation 615).

Once the input set is marshalled, the controller invokes the hash operation of the command on the input set (operation 620). Optionally, the controller can provide a key to the hash engine as part of the hash operation invocation (operation 625). The hash engine then provides the hash result (e.g., hash product) back to the controller (operation 630). The controller then stores the hash result in the storage portion as specified in the input message (e.g., the output address) (operation 635.

Figure 7:
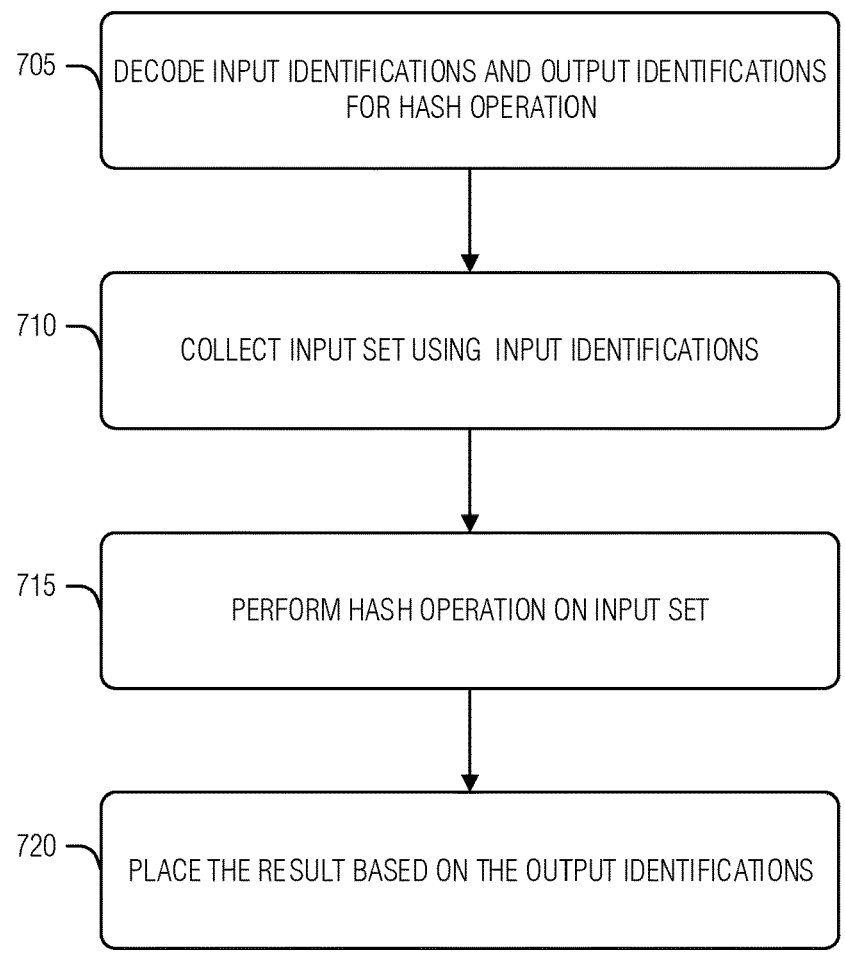
FIG. 7 illustrates a flow diagram of an example of a method for multi-factor intelligent agent control, according to an embodiment.

FIG. 7 illustrates a flow diagram of an example of a method 700 for multi-factor intelligent agent control, according to an embodiment. The operations of the method 700 are carried out on computer hardware, such as that described above with respect to FIG. 1, or below with respect to FIG. 8 (e.g., circuitry).

At operation 705, a data transmission received at an interface of the storage device is decoded. Here, the data transmission includes a command, a set of input identifications, and an output identification. The command corresponds to a hash operation.

In an example, a member of the set of input identifications is an address of a second portion of the storage device. In an example, the second portion of the storage device is accessible to an external entity via the interface to the storage device. In an example, the second portion of the storage device is block addressable.

In an example, the second portion of the storage device is not accessible to an external entity via the interface to the storage device. In an example, the second portion of the storage device is byte addressable. In an example, the second portion of the storage device is a register. In an example, the second portion of the storage device is a nonvolatile storage media.

In an example, the set of input identifications define an address range of a second portion of the storage device. In an example, two members of the set of input identifications define the address range. In an example, a first member of the two members defines the start of the range and a second member of the two members defines the end of the range. In an example, a first member of the two members defines the start of the range and a second member of the two members defines a number of units to include in the range.

In an example, a member of the set of input identifications identifies a portion of the data transmission. In an example, the portion of the data transmission is identified by a field. In an example, the portion of the data transmission is identified by an offset. In an example, the portion of the data transmission is also identified by a length.

In an example, the hash operation is a keyed-hash message authentication code (HMAC). In an example, a subset of the set of input identifications identify a secret. Here, the secret is used as a key for the HMAC. In an example, a member of the set of input identifications identifies a current session key of the storage device.

In an example, the interface of the storage device is a Joint Electron Device Engineering Council (JEDEC) memory standards interface. In an example, the storage device is a random access memory (RAM) device.

In an example, the interface of the storage device conforms to at least one of an Integrated Device Electronics (IDE) AT Attachment (ATA) interface, a serial ATA (SATA) interface, Small Computer System Interface (SCSI) interface, or Non-Volatile Memory Host Controller Interface Specification (NVMHCI) interface. In an example, the storage device is a flash memory device. In an example, the flash memory device is at least one of NOR flash or NAND flash. In an example, the storage device is a hard disk drive (HDD).

At operation 710, members of the set of input identifications are marshalled to produce an input set. Marshalling involves collecting the data identified in the input notifications and placing the data into the input set. In an example, marshalling the members of the set of input identifications includes retrieving data corresponding to an address of the set of input identifications to include in the input set.

At operation 715, a hash engine of the storage device is invoked on the input set to produce a hash product. In an example, the hash engine implements a cryptographic hash. In an example, the cryptographic hash is a secure hash algorithm (SHA). In an example, the hash engine produces a two hundred and fifty-six bit hash or a five hundred and twelve bit hash.

At operation 720, the hash product is stored in a portion of the storage device corresponding to the output identification.

Figure 8:
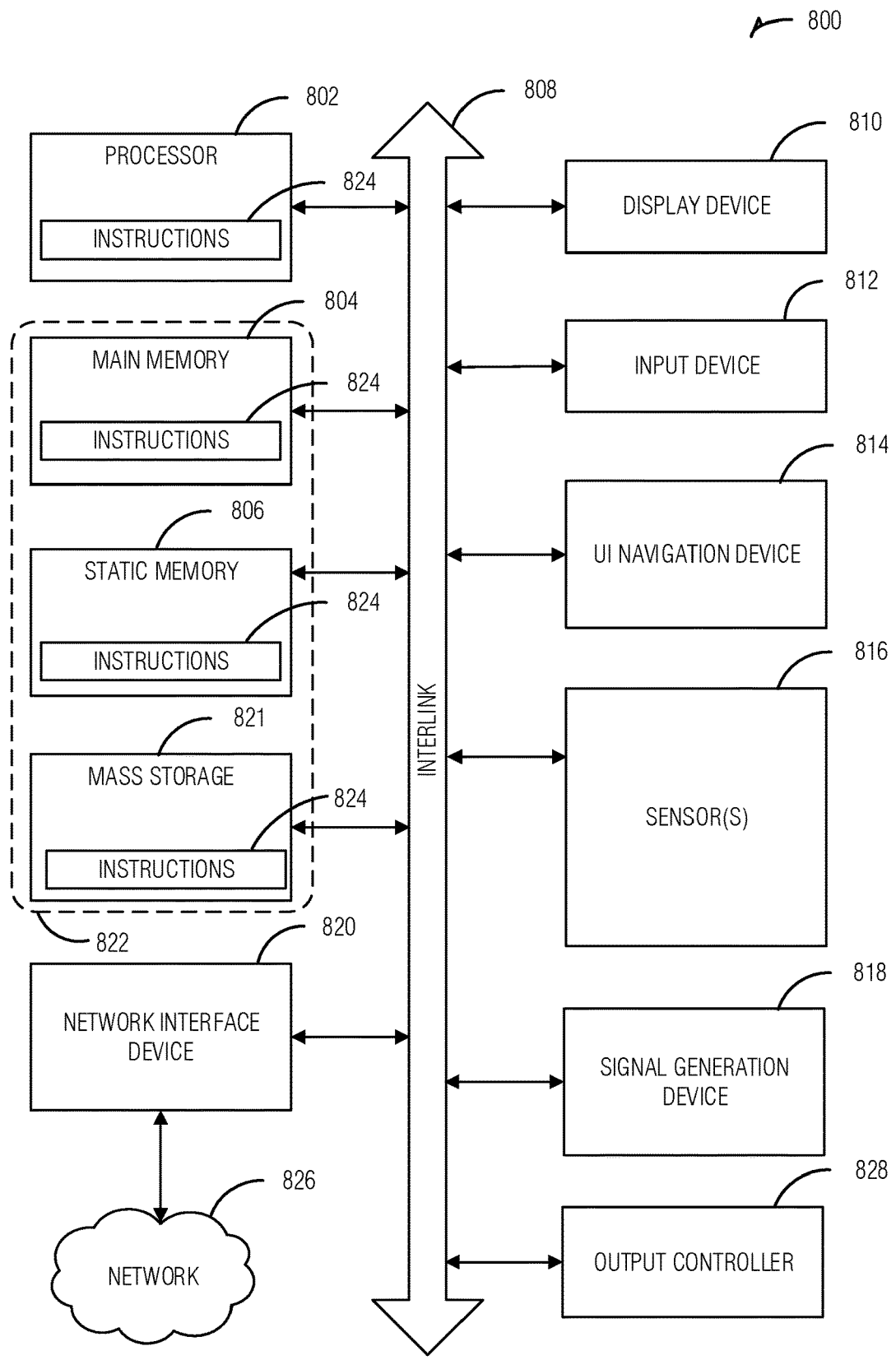
FIG. 8 is a block diagram illustrating an example of a machine upon which, or with which, one or more embodiments can be implemented.

FIG. 8 illustrates a block diagram of an example machine 800 upon which any one or more of the techniques (e.g., methodologies) discussed herein can perform. Examples, as described herein, can include, or can operate by, logic or a number of components, or mechanisms in the machine 800. Circuitry (e.g., processing circuitry) is a collection of circuits implemented in tangible entities of the machine 800 that include hardware (e.g., simple circuits, gates, logic, etc.). Circuitry membership can be flexible over time. Circuitries include members that can, alone or in combination, perform specified operations when operating. In an example, hardware of the circuitry can be immutably designed to carry out a specific operation (e.g., hardwired). In an example, the hardware of the circuitry can include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components can be used in more than one member of more than one circuitry. For example, under operation, execution units can be used in a first circuit of a first circuitry at one point in time and reused by a second circuit in the first circuitry, or by a third circuit in a second circuitry at a different time. Additional examples of these components with respect to the machine 800 follow.

In alternative embodiments, the machine 800 can operate as a standalone device or can be connected (e.g., networked) to other machines. In a networked deployment, the machine 800 can operate in the capacity of a server machine, a client machine, or both in server-client network environments. In an example, the machine 800 can act as a peer machine in peer-to-peer (P2P) (or other distributed) network environment. The machine 800 can be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 800 can include a hardware processor 802 (e.g., a central processing unit (CPU), a graphics processing unit (GPU), a hardware processor core, or any combination thereof), a main memory 804, a static memory (e.g., memory or storage for firmware, microcode, a basic-input-output (BIOS), unified extensible firmware interface (UEFI), etc.) 806, and mass storage 821 (e.g., hard drive, tape drive, flash storage, or other block devices) some or all of which can communicate with each other via an interlink (e.g., bus) 808. Main memory 804 is generally distinguishable from mash storage 821 by being byte addressable versus block addressable allowing direct consumption of its data by the processor 802. Further, main memory 804 is used by the processor 802 to store current (e.g., live) state information rather than information maintained between power-on and power-off cycles. The static memory 806 is generally used to directly modify or configure hardware, such as occurs on power-up, or to correct machine instructions (e.g., via microcode).

The machine 800 can further include a display unit 810, an alphanumeric input device 812 (e.g., a keyboard), and a user interface (UI) navigation device 814 (e.g., a mouse). In an example, the display unit 810, input device 812 and UI navigation device 814 can be a touch screen display. The machine 800 can additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 can include an output controller 828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The registers of the processor 802, the main memory 804, the static memory 806, or the mass storage 816 can be, or include, a machine readable medium 822 on which is stored one or more sets of data structures or instructions 824 (e.g., software) embodying or utilized by any one or more of the techniques or functions described herein. The instructions 824 can also reside, completely or at least partially, within any of registers of the processor 802, the main memory 804, the static memory 806, or the mass storage 816 during execution thereof by the machine 800. In an example, one or any combination of the hardware processor 802, the main memory 804, the static memory 806, or the mass storage 816 can constitute the machine readable media 802. While the machine readable medium 822 is illustrated as a single medium, the term "machine readable medium" can include a single medium or multiple media (e.g., a centralized or distributed database, and/or associated caches and servers) configured to store the one or more instructions 824.

The term "machine readable medium" can include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine readable medium examples can include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media can include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 824 can be further transmitted or received over a communications network 826 using a transmission medium via the network interface device 820 utilizing any one of a number of transfer protocols (e.g., frame relay, internet protocol (IP), transmission control protocol (TCP), user datagram protocol (UDP), hypertext transfer protocol (HTTP), etc.). Example communication networks can include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 820 can include one or more physical jacks (e.g., Ethernet, coaxial, or phone jacks) or one or more antennas to connect to the communications network 826. In an example, the network interface device 820 can include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 800, and includes digital or analog communications signals or other intangible medium to facilitate communication of such software. A transmission medium is a machine readable medium.

Additional Notes & Examples

Example 1 is a storage device including hash production components, the storage device comprising: a hash engine; an interface; a decoder to parse a command, a set of input identifications, and an output identification from a data transmission received at the interface; and a controller to: collect members of the set of input identifications to produce an input set; instruct the hash engine to produce a hash product from the input set; and write the hash product in a portion of the storage device corresponding to the output identification.

In Example 2, the subject matter of Example 1, wherein the set of input identifications define an address range of a second portion of the storage device.

In Example 3, the subject matter of Example 2, wherein two members of the set of input identifications define the address range.

In Example 4, the subject matter of Example 3, wherein a first member of the two members defines the start of the range and a second member of the two members defines the end of the range.

In Example 5, the subject matter of any one or more of Examples 3-4 optionally include wherein a first member of the two members defines the start of the range and a second member of the two members defines a number of units to include in the range.

In Example 6, the subject matter of any one or more of Examples 1-5 optionally include wherein a member of the set of input identifications is an address of a second portion of the storage device.

In Example 7, the subject matter of Example 6, wherein the second portion of the storage device is accessible to an external entity via the interface to the storage device.

In Example 8, the subject matter of Example 7, wherein the second portion of the storage device is block addressable.

In Example 9, the subject matter of any one or more of Examples 6-8 optionally include wherein the second portion of the storage device is not accessible to an external entity via the interface to the storage device.

In Example 10, the subject matter of Example 9, wherein the second portion of the storage device is byte addressable.

In Example 11, the subject matter of Example 10, wherein the second portion of the storage device is a register.

In Example 12, the subject matter of any one or more of Examples 9-11 optionally include wherein the second portion of the storage device is a nonvolatile storage media.

In Example 13, the subject matter of any one or more of Examples 1-12 optionally include wherein, to collect the members of the set of input identifications, the controller is to retrieve data corresponding to the address to include in the input set.

In Example 14, the subject matter of any one or more of Examples 1-13 optionally include wherein a member of the set of input identifications identifies a portion of the data transmission.

In Example 15, the subject matter of Example 14, wherein the portion of the data transmission is identified by a field.

In Example 16, the subject matter of any one or more of Examples 14-15 optionally include wherein the portion of the data transmission is identified by an offset.

In Example 17, the subject matter of Example 16, wherein the portion of the data transmission is also identified by a length.

In Example 18, the subject matter of any one or more of Examples 1-17 optionally include wherein a member of the set of input identifications identifies secret of the storage device.

In Example 19, the subject matter of Example 18, wherein the secret is a current session key of the storage device.

In Example 20, the subject matter of any one or more of Examples 1-19 optionally include wherein the hash operation is a keyed-hash message authentication code (HMAC).

In Example 21, the subject matter of Example 20, wherein a subset of the set of input identifications identify a secret, wherein the secret is used as a key for the HMAC.

In Example 22, the subject matter of any one or more of Examples 1-21 optionally include wherein the hash engine implements a cryptographic hash.

In Example 23, the subject matter of Example 22, wherein the cryptographic hash is a secure hash algorithm (SHA).

In Example 24, the subject matter of Example 23, wherein the hash engine produces a two hundred and fifty-six bit hash.

In Example 25, the subject matter of any one or more of Examples 1-24 optionally include wherein the interface of the storage device is a Joint Electron Device Engineering Council (JEDEC) memory standards interface.

In Example 26, the subject matter of Example 25, wherein the storage device is a random access memory (RAM) device.

In Example 27, the subject matter of any one or more of Examples 1-26 optionally include wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 28, the subject matter of Example 27, wherein the storage device is a flash memory device.

In Example 29, the subject matter of Example 28, wherein the flash memory device is at least one of NOR flash or NAND flash.

In Example 30, the subject matter of any one or more of Examples 27-29 optionally include wherein the storage device is a hard disk drive (HDD).

Example 31 is a computer implemented method for storage device hash production, the method comprising: decoding a data transmission received at an interface of the storage device, the data transmission including a command, a set of input identifications, and an output identification, the command corresponding to a hash operation; marshalling members of the set of input identifications to produce an input set; invoking a hash engine of the storage device on the input set to produce a hash product; and storing the hash product in a portion of the storage device corresponding to the output identification.

In Example 32, the subject matter of Example 31, wherein the set of input identifications define an address range of a second portion of the storage device.

In Example 33, the subject matter of Example 32, wherein two members of the set of input identifications define the address range.

In Example 34, the subject matter of Example 33, wherein a first member of the two members defines the start of the range and a second member of the two members defines the end of the range.

In Example 35, the subject matter of any one or more of Examples 33-34 optionally include wherein a first member of the two members defines the start of the range and a second member of the two members defines a number of units to include in the range.

In Example 36, the subject matter of any one or more of Examples 31-35 optionally include wherein a member of the set of input identifications is an address of a second portion of the storage device.

In Example 37, the subject matter of Example 36, wherein the second portion of the storage device is accessible to an external entity via the interface to the storage device.

In Example 38, the subject matter of Example 37, wherein the second portion of the storage device is block addressable.

In Example 39, the subject matter of any one or more of Examples 36-38 optionally include wherein the second portion of the storage device is not accessible to an external entity via the interface to the storage device.

In Example 40, the subject matter of Example 39, wherein the second portion of the storage device is byte addressable.

In Example 41, the subject matter of Example 40, wherein the second portion of the storage device is a register.

In Example 42, the subject matter of any one or more of Examples 39-41 optionally include wherein the second portion of the storage device is a nonvolatile storage media.

In Example 43, the subject matter of any one or more of Examples 31-42 optionally include wherein marshalling the members of the set of input identifications includes retrieving data corresponding to the address to include in the input set.

In Example 44, the subject matter of any one or more of Examples 31-43 optionally include wherein a member of the set of input identifications identifies a portion of the data transmission.

In Example 45, the subject matter of Example 44, wherein the portion of the data transmission is identified by a field.

In Example 46, the subject matter of any one or more of Examples 44-45 optionally include wherein the portion of the data transmission is identified by an offset.

In Example 47, the subject matter of Example 46, wherein the portion of the data transmission is also identified by a length.

In Example 48, the subject matter of any one or more of Examples 31-47 optionally include wherein a member of the set of input identifications identifies secret of the storage device.

In Example 49, the subject matter of Example 48, wherein the secret is a current session key of the storage device.

In Example 50, the subject matter of any one or more of Examples 31-49 optionally include wherein the hash operation is a keyed-hash message authentication code (HMAC).

In Example 51, the subject matter of Example 50, wherein a subset of the set of input identifications identify a secret, wherein the secret is used as a key for the HMAC.

In Example 52, the subject matter of any one or more of Examples 31-51 optionally include wherein the hash engine implements a cryptographic hash.

In Example 53, the subject matter of Example 52, wherein the cryptographic hash is a secure hash algorithm (SHA).

In Example 54, the subject matter of Example 53, wherein the hash engine produces a two hundred and fifty-six bit hash.

In Example 55, the subject matter of any one or more of Examples 31-54 optionally include wherein the interface of the storage device is a Joint Electron Device Engineering Council (JEDEC) memory standards interface.

In Example 56, the subject matter of Example 55, wherein the storage device is a random access memory (RAM) device.

In Example 57, the subject matter of any one or more of Examples 31-56 optionally include wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 58, the subject matter of Example 57, wherein the storage device is a flash memory device.

In Example 59, the subject matter of Example 58, wherein the flash memory device is at least one of NOR flash or NAND flash.

In Example 60, the subject matter of any one or more of Examples 57-59 optionally include wherein the storage device is a hard disk drive (HDD).

In Example 61, the subject matter of any one or more of Examples 31-60 optionally include receiving a write command at the interface, the write command including data and an address for the portion of the data store, the address included in the set of input identifications.

In Example 62, the subject matter of any one or more of Examples 31-61 optionally include receiving a read command at the interface, the read command specifying the output identification.

In Example 63, the subject matter of Example 62 optionally includes retrieving the hash product from the portion of storage to complete the read command.

Example 64 is at least one non-transitory machine readable medium including instructions that, when executed by processing circuitry, cause the processing circuitry to perform any method of Examples 31-63.

Example 65 is a system comprising means to perform any method of Examples 31-63.

Example 66 is a computer implemented at least one machine readable medium for storage device hash production, the at least one machine readable medium comprising: decoding a data transmission received at an interface of the storage device, the data transmission including a command, a set of input identifications, and an output identification, the command corresponding to a hash operation; marshalling members of the set of input identifications to produce an input set; invoking a hash engine of the storage device on the input set to produce a hash product; and storing the hash product in a portion of the storage device corresponding to the output identification.

In Example 67, the subject matter of Example 66, wherein the set of input identifications define an address range of a second portion of the storage device.

In Example 68, the subject matter of Example 67, wherein two members of the set of input identifications define the address range.

In Example 69, the subject matter of Example 68, wherein a first member of the two members defines the start of the range and a second member of the two members defines the end of the range.

In Example 70, the subject matter of any one or more of Examples 68-69 optionally include wherein a first member of the two members defines the start of the range and a second member of the two members defines a number of units to include in the range.

In Example 71, the subject matter of any one or more of Examples 66-70 optionally include wherein a member of the set of input identifications is an address of a second portion of the storage device.

In Example 72, the subject matter of Example 71, wherein the second portion of the storage device is accessible to an external entity via the interface to the storage device.

In Example 73, the subject matter of Example 72, wherein the second portion of the storage device is block addressable.

In Example 74, the subject matter of any one or more of Examples 71-73 optionally include wherein the second portion of the storage device is not accessible to an external entity via the interface to the storage device.

In Example 75, the subject matter of Example 74, wherein the second portion of the storage device is byte addressable.

In Example 76, the subject matter of Example 75, wherein the second portion of the storage device is a register.

In Example 77, the subject matter of any one or more of Examples 74-76 optionally include wherein the second portion of the storage device is a nonvolatile storage media.

In Example 78, the subject matter of any one or more of Examples 66-77 optionally include wherein marshalling the members of the set of input identifications includes retrieving data corresponding to the address to include in the input set.

In Example 79, the subject matter of any one or more of Examples 66-78 optionally include wherein a member of the set of input identifications identifies a portion of the data transmission.

In Example 80, the subject matter of Example 79, wherein the portion of the data transmission is identified by a field.

In Example 81, the subject matter of any one or more of Examples 79-80 optionally include wherein the portion of the data transmission is identified by an offset.

In Example 82, the subject matter of Example 81, wherein the portion of the data transmission is also identified by a length.

In Example 83, the subject matter of any one or more of Examples 66-82 optionally include wherein a member of the set of input identifications identifies secret of the storage device.

In Example 84, the subject matter of Example 83, wherein the secret is a current session key of the storage device.

In Example 85, the subject matter of any one or more of Examples 66-84 optionally include wherein the hash operation is a keyed-hash message authentication code (HMAC).

In Example 86, the subject matter of Example 85, wherein a subset of the set of input identifications identify a secret, wherein the secret is used as a key for the HMAC.

In Example 87, the subject matter of any one or more of Examples 66-86 optionally include wherein the hash engine implements a cryptographic hash.

In Example 88, the subject matter of Example 87, wherein the cryptographic hash is a secure hash algorithm (SHA).

In Example 89, the subject matter of Example 88, wherein the hash engine produces a two hundred and fifty-six bit hash.

In Example 90, the subject matter of any one or more of Examples 66-89 optionally include wherein the interface of the storage device is a Joint Electron Device Engineering Council (JEDEC) memory standards interface.

In Example 91, the subject matter of Example 90, wherein the storage device is a random access memory (RAM) device.

In Example 92, the subject matter of any one or more of Examples 66-91 optionally include wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 93, the subject matter of Example 92, wherein the storage device is a flash memory device.

In Example 94, the subject matter of Example 93, wherein the flash memory device is at least one of NOR flash or NAND flash.

In Example 95, the subject matter of any one or more of Examples 92-94 optionally include wherein the storage device is a hard disk drive (HDD).

Example 96 is a computer implemented system for storage device hash production, the system comprising: means for decoding a data transmission received at an interface of the storage device, the data transmission including a command, a set of input identifications, and an output identification, the command corresponding to a hash operation; means for marshalling members of the set of input identifications to produce an input set; means for invoking a hash engine of the storage device on the input set to produce a hash product; and means for storing the hash product in a portion of the storage device corresponding to the output identification.

In Example 97, the subject matter of Example 96, wherein the set of input identifications define an address range of a second portion of the storage device.

In Example 98, the subject matter of Example 97, wherein two members of the set of input identifications define the address range.

In Example 99, the subject matter of Example 98, wherein a first member of the two members defines the start of the range and a second member of the two members defines the end of the range.

In Example 100, the subject matter of any one or more of Examples 98-99 optionally include wherein a first member of the two members defines the start of the range and a second member of the two members defines a number of units to include in the range.

In Example 101, the subject matter of any one or more of Examples 96-100 optionally include wherein a member of the set of input identifications is an address of a second portion of the storage device.

In Example 102, the subject matter of Example 101, wherein the second portion of the storage device is accessible to an external entity via the interface to the storage device.

In Example 103, the subject matter of Example 102, wherein the second portion of the storage device is block addressable.

In Example 104, the subject matter of any one or more of Examples 101-103 optionally include wherein the second portion of the storage device is not accessible to an external entity via the interface to the storage device.

In Example 105, the subject matter of Example 104, wherein the second portion of the storage device is byte addressable.

In Example 106, the subject matter of Example 105, wherein the second portion of the storage device is a register.

In Example 107, the subject matter of any one or more of Examples 104-106 optionally include wherein the second portion of the storage device is a nonvolatile storage media.

In Example 108, the subject matter of any one or more of Examples 96-107 optionally include wherein marshalling the members of the set of input identifications includes retrieving data corresponding to the address to include in the input set.

In Example 109, the subject matter of any one or more of Examples 96-108 optionally include wherein a member of the set of input identifications identifies a portion of the data transmission.

In Example 110, the subject matter of Example 109, wherein the portion of the data transmission is identified by a field.

In Example 111, the subject matter of any one or more of Examples 109-110 optionally include wherein the portion of the data transmission is identified by an offset.

In Example 112, the subject matter of Example 111, wherein the portion of the data transmission is also identified by a length.

In Example 113, the subject matter of any one or more of Examples 96-112 optionally include wherein a member of the set of input identifications identifies secret of the storage device.

In Example 114, the subject matter of Example 113, wherein the secret is a current session key of the storage device.

In Example 115, the subject matter of any one or more of Examples 96-114 optionally include wherein the hash operation is a keyed-hash message authentication code (HMAC).

In Example 116, the subject matter of Example 115, wherein a subset of the set of input identifications identify a secret, wherein the secret is used as a key for the HMAC.

In Example 117, the subject matter of any one or more of Examples 96-116 optionally include wherein the hash engine implements a cryptographic hash.

In Example 118, the subject matter of Example 117, wherein the cryptographic hash is a secure hash algorithm (SHA).

In Example 119, the subject matter of Example 118, wherein the hash engine produces a two hundred and fifty-six bit hash.

In Example 120, the subject matter of any one or more of Examples 96-119 optionally include wherein the interface of the storage device is a Joint Electron Device Engineering Council (JEDEC) memory standards interface.

In Example 121, the subject matter of Example 120, wherein the storage device is a random access memory (RAM) device.

In Example 122, the subject matter of any one or more of Examples 96-121 optionally include wherein the interface of the storage device conforms to at least one of an Integrated Device Electronics (IDE) AT Attachment (ATA) interface, a serial ATA (SATA) interface, a Small Computer System Interface (SCSI) interface, a Universal Flash Storage (UFS) interface, an embedded MultiMedia Card (eMMC) interface, or Non-Volatile Memory Host Controller Interface Specification (NVMHCI) interface.

In Example 123, the subject matter of Example 122, wherein the storage device is a flash memory device.

In Example 124, the subject matter of Example 123, wherein the flash memory device is at least one of NOR flash or NAND flash.

In Example 125, the subject matter of any one or more of Examples 122-124 optionally include wherein the storage device is a hard disk drive (HDD).

The above detailed description includes references to the accompanying drawings, which form a part of the detailed description. The drawings show, by way of illustration, specific embodiments that can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) can be used in combination with each other. Other embodiments can be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features can be grouped together to streamline the disclosure. This should not be interpreted as intending that an unclaimed disclosed feature is essential to any claim. Rather, inventive subject matter can lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A storage device including hash production components, the storage device comprising:
    a hash engine;
    an interface used to read and write storage data and is standard for storage devices that differ from the storage device by omitting the hash engine;
    a decoder to:
        parse a first command, a set of input identifications, and an output identification from a first data transmission and received at the interface from an external entity, wherein the set of input identifications and the output identification correspond to addresses for data in the storage device which can be accessed by the external entity using standard read or write operations to the storage device; and
        parse a second command and an address from a second data transmission, the second command being a standard read command for the storage device the address corresponding to the output identification; and
    a controller to:
        collect members of the set of input identifications to produce an input set in response to receipt of the first command;
        instruct the hash engine to produce a hash product from the input set;
        write the hash product in a portion of the storage device corresponding to the output identification; and
        transmit, in response to receipt of the second command, the hash product from the portion of the storage device corresponding to the address.

2. The storage device of claim 1, wherein the set of input identifications define an address range of a second portion of the storage device.

3. The storage device of claim 2, wherein two members of the set of input identifications define the address range.

4. The storage device of claim 1, wherein the storage device is block addressable.

5. The storage device of claim 1, wherein a member of the set of input identifications identifies a portion of the first data transmission.

6. The storage device of claim 5, wherein the portion of the first data transmission is identified by a field.

7. The storage device of claim 5, wherein the portion of the first data transmission is identified by an offset.

8. The storage device of claim 7, wherein the portion of the first data transmission is also identified by a length.

9. The storage device of claim 1, wherein a member of the set of input identifications identifies a secret of the storage device.

10. The storage device of claim 9, wherein the secret is a current session key of the storage device.

11. The storage device of claim 1, wherein the hash product is a keyed-hash message authentication code (HMAC).

12. The storage device of claim 11, wherein a subset of the set of input identifications identify a secret, wherein the secret is used as a key for the HMAC.

13. The storage device of claim 1, wherein the hash engine implements a cryptographic hash.

14. The storage device of claim 13, wherein the cryptographic hash is a secure hash algorithm (SHA).

15. The storage device of claim 14, wherein the hash engine produces a two hundred and fifty-six bit hash.

16. At least one non-transitory machine readable medium including instructions for storage device hash production, the instructions, when executed by processing circuitry, cause the processing circuitry to perform operations comprising:
    decoding a first data transmission received at an interface of the storage device from an external entity, the first data transmission including a first command, a set of input identifications, and an output identification, the command corresponding to a hash operation, the interface used to read and write storage data and is standard for storage devices that differ from the storage device by omitting a hash engine, the set of input identifications and the output identification correspond to addresses for data in the storage device which can be accessed by the external entity using standard read or write operations to the storage device;
    marshalling members of the set of input identifications to produce an input set in response to decoding the first command;
    invoking the hash engine of the storage device on the input set to produce a hash product;
    storing the hash product in a portion of the storage device corresponding to the output identification;
    decoding a second data transmission received at the interface from the external entity, the second data transmission including a second command and an address, the second command being a standard read command for the storage device, the address corresponding to the output identification; and
    transmitting, in response to decoding the second command, the hash product from the portion of the storage device corresponding to the address.

17. The at least one machine readable medium of claim 16, wherein the set of input identifications define an address range of a second portion of the storage device.

18. The at least one machine readable medium of claim 17, wherein two members of the set of input identifications define the address range.

19. The at least one machine readable medium of claim 16, wherein the storage device is block addressable.

20. The at least one machine readable medium of claim 16, wherein a member of the set of input identifications identifies a portion of the first data transmission.

21. The at least one machine readable medium of claim 20, wherein the portion of the first data transmission is identified by a field.

22. The at least one machine readable medium of claim 20, wherein the portion of the first data transmission is identified by an offset.

23. The at least one machine readable medium of claim 22, wherein the portion of the first data transmission is also identified by a length.

24. The at least one machine readable medium of claim 16, wherein a member of the set of input identifications identifies a secret of the storage device.

25. The at least one machine readable medium of claim 24, wherein the secret is a current session key of the storage device.

26. The at least one machine readable medium of claim 16, wherein the hash product is a keyed-hash message authentication code (HMAC).

27. The at least one machine readable medium of claim 26, wherein a subset of the set of input identifications identify a secret, wherein the secret is used as a key for the HMAC.

28. The at least one machine readable medium of claim 16, wherein the hash engine implements a cryptographic hash.

29. The at least one machine readable medium of claim 28, wherein the cryptographic hash is a secure hash algorithm (SHA).

30. The at least one machine readable medium of claim 29, wherein the hash engine produces a two hundred and fifty-six bit hash.

* * * * *